(12) United States Patent
Forster

(10) Patent No.: US 8,701,271 B2
(45) Date of Patent: Apr. 22, 2014

(54) METHOD OF ASSEMBLY OF ARTICLES

(75) Inventor: Ian J. Forster, Essex (GB)

(73) Assignee: Avery Dennison Corporation, Glendale, CA (US)

( * ) Notice: Subject to any disclaimer, the term of this patent is extended or adjusted under 35 U.S.C. 154(b) by 669 days.

(21) Appl. No.: 12/759,728

(22) Filed: Apr. 14, 2010

(65) Prior Publication Data

US 2011/0256357 A1    Oct. 20, 2011

(51) Int. Cl.
*B21D 39/03* (2006.01)
*B23P 11/00* (2006.01)

(52) U.S. Cl.
USPC .............. 29/600; 29/446; 29/854; 29/601; 29/830; 29/623.3; 428/172

(58) Field of Classification Search
USPC ........... 29/428, 446, 449, 452, 854, 600, 601, 29/830, 623.3; 428/172
See application file for complete search history.

(56) References Cited

U.S. PATENT DOCUMENTS

| | | | | |
|---|---|---|---|---|
| 2,041,848 A * | 5/1936 | Marinsky | ...................... | 264/252 |
| 6,147,662 A * | 11/2000 | Grabau et al. | ................ | 343/895 |
| 6,357,503 B1 * | 3/2002 | Kromer et al. | ................ | 156/351 |
| 6,667,092 B1 * | 12/2003 | Brollier et al. | ................ | 428/182 |
| 7,132,151 B2 * | 11/2006 | Rasmussen | .................... | 428/182 |
| 7,147,028 B2 * | 12/2006 | Denholm et al. | ............. | 156/569 |
| 7,384,496 B2 * | 6/2008 | Cote et al. | ...................... | 156/277 |
| 7,431,784 B2 * | 10/2008 | Melzer et al. | .................... | 156/64 |
| 7,500,307 B2 * | 3/2009 | Munn | ............................. | 29/832 |
| 7,646,304 B2 * | 1/2010 | Cote et al. | ................. | 340/572.7 |
| 7,704,346 B2 * | 4/2010 | Cote | ............................. | 156/253 |
| 7,901,533 B2 * | 3/2011 | Steidinger | ..................... | 156/247 |
| 7,975,414 B2 * | 7/2011 | Ritamaki et al. | ................ | 40/638 |
| 8,038,072 B2 * | 10/2011 | Ohashi et al. | ................. | 235/492 |
| 8,067,253 B2 * | 11/2011 | Ferguson et al. | .............. | 438/26 |
| 8,299,968 B2 * | 10/2012 | Osamura et al. | .......... | 343/700 R |
| 2008/0295318 A1 * | 12/2008 | Bohn | ............................. | 29/601 |

* cited by examiner

*Primary Examiner* — Peter DungBa Vo
*Assistant Examiner* — Jeffrey T Carley
(74) *Attorney, Agent, or Firm* — Avery Dennison Corporation

(57) ABSTRACT

An assembly method for first and second articles is disclosed. A first substrate with a plurality of first articles and a second substrate with a plurality of second articles are selected. The articles on the flexible substrate webs with different pitches are assembled together by displacing portions between the first articles of one web out of plane to move the first articles on that web to the same shorter pitch as the second articles on the other web, aligning the two webs to register corresponding first and second articles on the two webs, and assembling the corresponding articles together. The assembly may be used for example in the making of RFID tags, labels and inlays.

15 Claims, 4 Drawing Sheets

METHOD OF ASSEMBLY OF ARTICLES

TECHNICAL FIELD OF THE INVENTION

This disclosure relates to methods for high-speed assembly of articles arranged in linear arrays, and in particular to articles arranged in linear arrays that have different dimensions and/or pitch.

BACKGROUND OF THE INVENTION

Automatic identification of products has become commonplace. For example, the ubiquitous barcode label, placed on food, clothing, and other objects, is currently the most widespread automatic identification technology that is used to provide merchants, retailers and shippers with information associated with each object or item of merchandise.

Another technology used for automatic identification products is Radio Frequency Identification (RFID). RFID uses labels or "tags" that include electronic components that respond to radio frequency commands and signals to provide identification of each tag wirelessly. Generally, RFID tags and labels comprise an integrated circuit (IC, or chip) attached to an antenna that responds to a reader using radio waves to store and access the information in the chip. Specifically, RFID tags and labels have a combination of antennas and analog and/or digital electronics, which often includes communications electronics, data memory, and control logic.

One of the obstacles to more widespread adoption of RFID technology is that the cost of RFID tags are still relatively high as lower cost components and optimization of economical manufacturing of RFID tags has not been achievable using current production methods. Additionally, as the demand for RFID tags has increased the pressure has also increased for manufacturers to reduce the cost of the tags, as well as to reduce the size of the electronics as much as possible so as to: (1) increase the yield of the number of chips (dies) that may be produced from a semiconductor wafer, (2) reduce the potential for damage, as the final device size is smaller, and (3) increase the amount of flexibility in deployment, as the reduced amount of space needed to provide the same functionality may be used to provide more capability.

However, as the chips become smaller, their interconnection with other device components, e.g., antennas, becomes more difficult. Thus, to interconnect the relatively small contact pads on the chips to the antennas, intermediate structures variously referred to as "straps," "interposers," and "carriers" are sometimes used to facilitate inlay manufacture. Interposers include conductive leads or pads that are electrically coupled to the contact pads of the chips for coupling to the antennas. These leads provide a larger effective electrical contact area between the chips and the antenna than do the contact pads of the chip alone. Otherwise, an antenna and a chip would have to be more precisely aligned with each other for direct placement of the chip on the antenna without the use of such strap. The larger contact area provided by the strap reduces the accuracy required for placement of the chips during manufacture while still providing effective electrical connection between the chip and the antenna. However, the accurate placement and mounting of the dies on straps and interposers still provide serious obstacles for high speed manufacturing of RFID tags and labels.

One such challenging area arises from the fact that the various elements that are assembled to form a complete RFID device are provided arranged on linear arrays such as on a tape or web. The two webs are unwound at matched speeds so that each pair of articles to be assembled reach the assembly point at the same instant, where they are assembled together (e.g. via application of heat, pressure, adhesives, solder, mechanical fasteners, any combination of the foregoing, etc.) For purposes of increasing efficiency, the pitch of these articles (i.e. spacing between them) on the substrate is typically as close as practicable. In the case of antennas and straps, however, because of their different physical size and their respective manufacturing processes as well as subsequent assembly steps for the final product, the pitch of the arrays of the antennas and of the straps on their respective substrates is different. Thus registering (i.e. matching) a strap array with an antenna array is a rather difficult task. Current solutions to this problem include cutting each individual strap and accelerating it to meet the respective antenna at the point of assembly, or unwinding the two webs at different speeds. As those skilled in the art will appreciate, both of these solutions require sophisticated equipment and are prone to encounter problems as the assembly speed is increased.

What is therefore needed are simpler and more economical methods and devices for assembling together articles that are delivered in linear arrays arranged on substrates at different pitches, and which will support high speed assembly of the articles. The embodiments of the present disclosure answer these and other needs.

BRIEF SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

The present invention is directed to a process for optimization of RFID manufacture by displacing material web length of one web in order to quickly assemble components from a second web to create an intermediate assembly which can be used to form a finished product.

In a first embodiment disclosed herein, an assembly method comprises selecting a first flexible planar substrate with a plurality of first articles disposed in a linear array thereon with a first spacing between adjacent first articles; selecting a second planar substrate with a plurality of second articles disposed in a linear array thereon with a second spacing between adjacent second articles that is shorter than the first spacing; displacing portions of the first substrate between adjacent first elements out of the plane of the first substrate to thereby draw adjacent first elements closer to one another; aligning the first and second substrates so that each first article is disposed in succession adjacent a corresponding second article in succession; and assembling each first article to the corresponding second article. Displacing portions of the first substrate between adjacent first elements out of the plane of the first substrate may be accomplished by applying negative pressure to portions of the first substrate in order to draw out portions of the plane. In another embodiment, the application of positive pressure can be used to displace portions of the first substrate between adjacent first elements out of the plane of the first substrate. Positive pressure may comprise applying a mechanical force to portions of the first substrate to impel portions out of the plane.

In another embodiment disclosed herein, an assembly method comprises bending a web between first components out of plane until the first components match the pitch of second components on another web and attaching the first components to corresponding second components.

In a still further exemplary embodiment of the presently described invention, an intermediate assembly is provided and includes a first web having a plurality of first elements spaced apart a first distance. A second web is provided that has a plurality of second elements distinct from the first element and spaced apart from one another a second distance different than the first distance. The second web is displaced from a machine direction to a second direction substantially perpendicular to the machine direction. The first web is disposed over the second web such that the first elements are juxtaposed over the second elements in a one to one relationship.[0013] These and other features and advantages will become further apparent from the detailed description and accompanying figures that follow. In the figures and description, numerals indicate the various features, like numerals referring to like features throughout both the drawings and the description.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which.

DETAILED DESCRIPTION

Figure 1A:
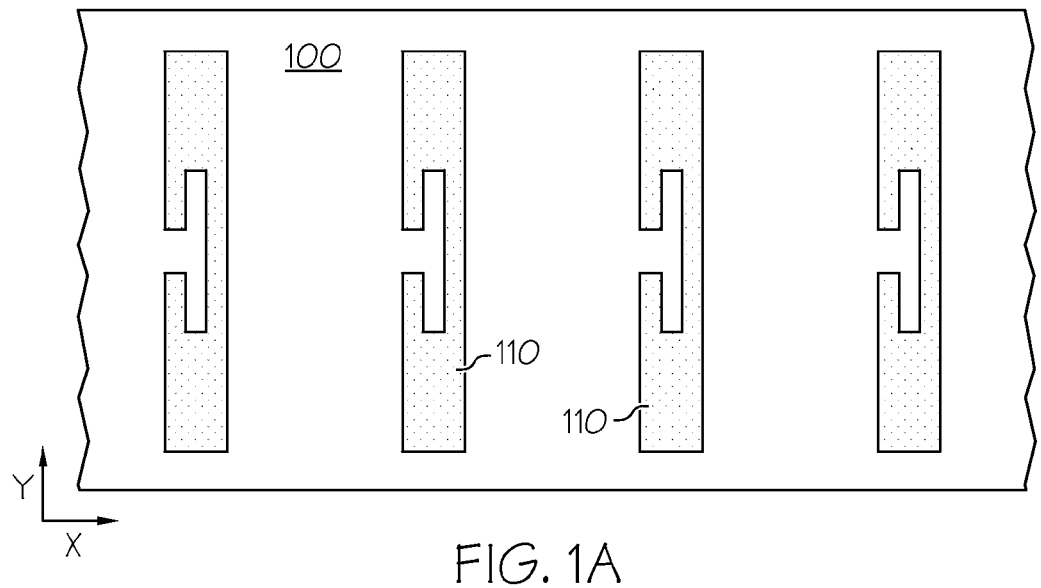
FIG. 1(a)-(b) is a schematic front view of webs with articles as may be utilized with the method of the present disclosure.
Figure 1B:
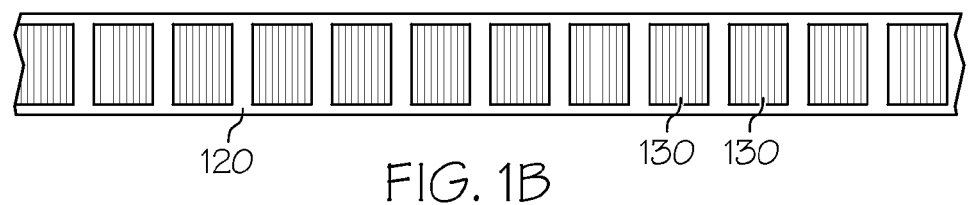

Referring to FIG. 1, a typical web 100 with antenna elements 110 for RFID devices is illustrated in FIG. 1(a), and a typical web 120 with, e.g., straps 130 is illustrated in FIG. 1(b). As clearly shown, and as discussed previously, the antennas 110 and straps 130 are spaced with a different pitch on their respective webs 100, 120. In accordance with the present disclosure, in order to match every single strap 130 on the web in order with a corresponding antenna 110, the web with the greater pitch between the articles disposed thereon— is intermittently displaced along its length and out of its normal plane or direction of machine travel such that the antenna elements disposed thereon are brought physical closer to each other until they are disposed with a pitch there between that is sufficiently equal to the pitch of the straps web 120 to allow assembly of antenna-strap pairs. In this exemplary embodiment, the antenna web 100 has the greatest pitch.

Figure 2A:
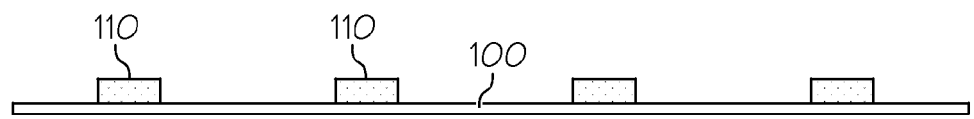
FIG. 2(a)-(b) is a side view of one the webs with articles of FIG. 1 before and after processed by the method of the present disclosure.
Figure 2B:
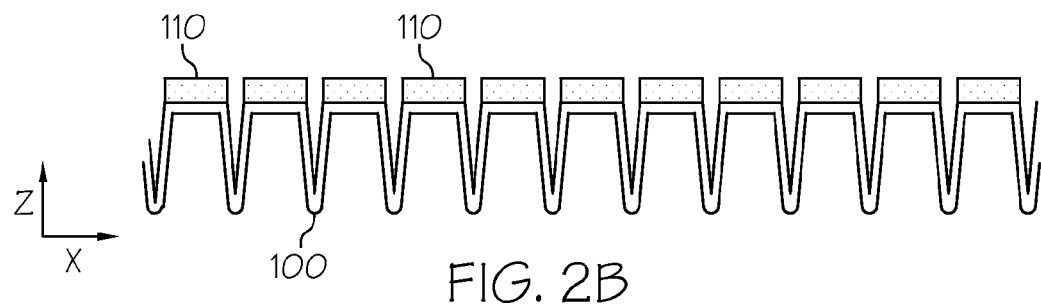

This concept is best illustrated in FIG. 2, which depicts a side view of antenna web 100. If it can be said, for purposes of discussion, that the antenna web lies in a plane defined by x- and y-axes with the antennas 110 extending linearly along the x-axis, in a machine direction, then FIG. 2(a) depicts the antenna web as it extends along the x- and z-axes, looking along the y-axis. As depicted in FIG. 2(b), in accordance with the present disclosure, the antenna web 100 is displaced between the antenna elements 110 prior to assembly so that the portions of the antenna web lying between adjacent antenna elements are extended along the z-axis, thereby drawing adjacent antenna elements closer to each other.

Figure 3A:
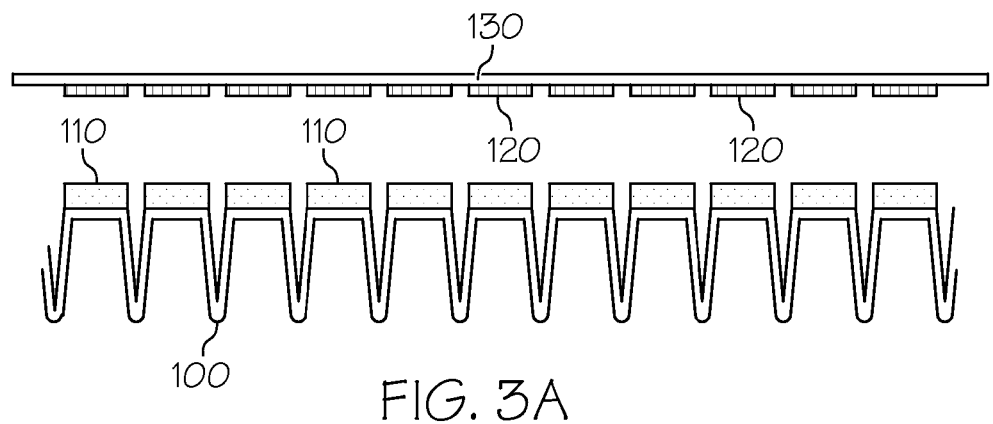
FIG. 3(a)-(b) is a side view of the webs with articles of FIG. 1 being assembled in accordance with the method of the present disclosure.
Figure 3B:
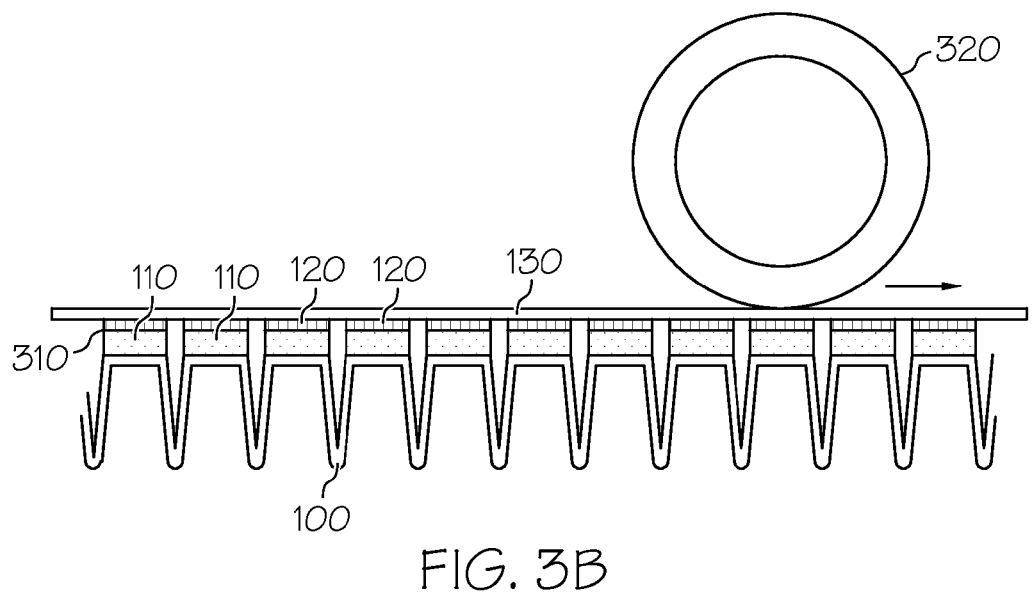

As illustrated in FIG. 3(a), displacing the antenna web 100 along the z-axis as described allows matching the pitch of the antenna elements 110 to match the pitch of the straps 130 as they are disposed on the undistorted strap web 120. That is, the strap web or first element web remains in the first plane or y axis in a machine direction and portions are not displaced out of alignment from this plane, the web remains in its machine direction position. This in turn, and as depicted in FIG. 3(b), allows corresponding antennas and straps on the two respective webs 100, 120 to be easily and simply registered, contacted (such as with adhesive 310) and optionally heat and/or pressure treated with an appropriate device 320. Additional methods of assembly may include soldering, and welding, the straps and the antennas to one another.

Figure 4A:
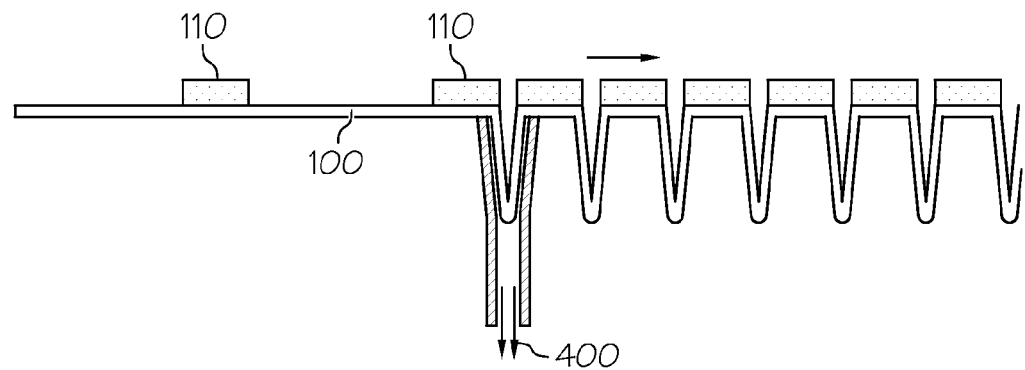
FIG. 4(a)-(b) illustrate different embodiments of practicing the method of the present disclosure.
Figure 4B:
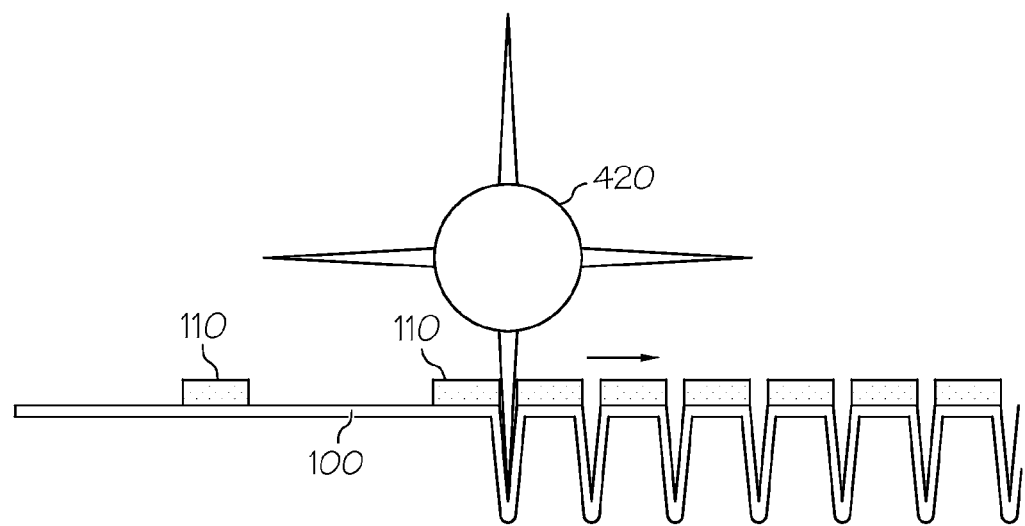

Displacing the antenna web 100 along the z-axis as disclosed herein may be accomplished by any practicable means, at least some of which will be immediately obvious to the skilled person, and the method of displacement is in no way a limit upon the scope of the presently claimed invention. For purposes of illustration only and with reference to FIG. 4(a), one possible method is to apply a vacuum or suction force 400 to the portions of the web lying between adjacent articles disposed thereon, because as known in the art, the webs are typically formed of a flexible material, such as plastic, paper, foils and the like. In another illustrative, non-limiting embodiment depicted in FIG. 4(b) (not drawn to scale), a mechanical force such as applied by a toothed wheel 420 may be impinged onto the portions of the web lying between adjacent articles disposed thereon to force them to extend (i.e. fold) into the z-axis dimension. Alternatively, a blast of air or gas could be impinged onto the web, in a method essentially opposite to that of FIG. 4(a). In addition, stepper motors, dancer bars and the like may be used to create the displacement in the web.

Following registering and assembly of each antenna and strap pair, the strap web 120 may be cut between each strap to thereby allow expanding the distorted portions of the antenna web 100 and thereby returning the antenna web to a planar configuration for subsequent processing steps.

Figure 5:
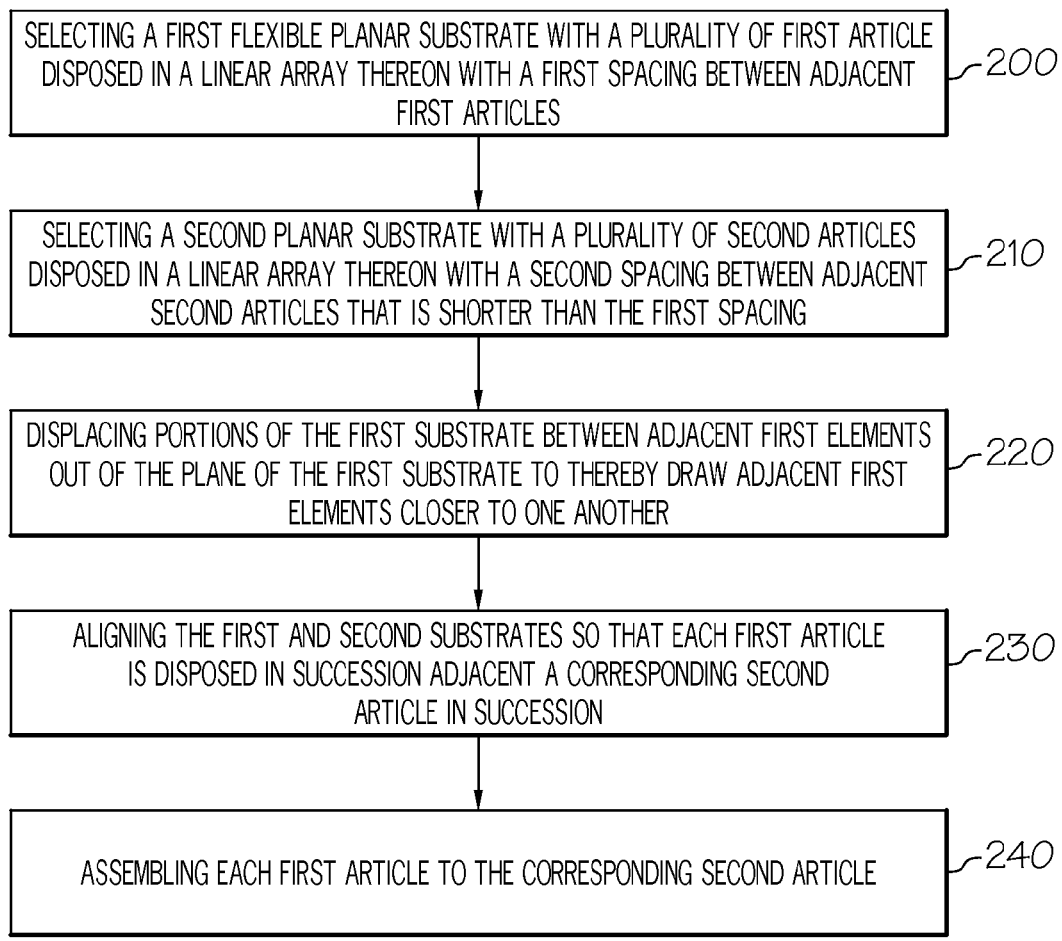
FIG. 5 provides a block diagram for an exemplary assembly method for high speed assembly of articles arranged in linear arrays that have different dimensions and/or pitch.

FIG. 5 illustrates a block diagram of an exemplary method of articles arranged in linear arrays. A first flexible planar substrate is selected with a plurality of first articles disposed in a linear array thereon with a first spacing between adjacent first articles at step 200. A second planar substrate is then selected with a plurality of second articles disposed in a linear array thereon with a second spacing between adjacent second articles that is shorter than the first spacing at step 210. Third, displacing portions of the first substrate between adjacent first elements (e.g. antenna) of the plane of the first substrate to thereby draw adjacent first elements closer to one another at step 220. Fourth, the first and second substrates are aligned so that each first article or element is disposed in succession adjacent a corresponding second article (strap, transponder, chip or second element) in succession 230. Lastly, the first article is assembled corresponding to the second article 240.

It is important to understand that the present invention is not limited to antenna and strap elements for RFID devices, which were discussed for ease of illustration only. Rather, the method of the present invention may be applied to any assembly process that entails assembling articles disposed on flexible substrates at a different pitch on each respective web. As will be appreciated by the skilled reader, the method of the present invention allows the design and use of simpler and thereby more cost effective and robust assembly machines, and higher assembly speeds. In addition, the process of the present invention could also be used in the assembly of finished RFID tags, such as apparel hang tags and labels. For example, a web of RFID inlays can have a first pitch and a web of material to form apparel hang tags has a second pitch. The RFID inlay web may go through the displacement so as to align with the material to form the finished RFID tags.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . ."

What is claimed is:

1. An assembly method, comprising:
    selecting a first flexible planar substrate with a plurality of first articles disposed in a linear array thereon with a first spacing between adjacent first articles;
    selecting a second planar substrate with a plurality of second articles disposed in a linear array thereon with a second spacing between adjacent second articles that is shorter than the first spacing;
    displacing portions of the first substrate between adjacent first articles out of the plane of the first substrate to thereby draw adjacent first articles closer to one another;
    aligning the first and second substrates so that each first article is disposed in succession adjacent a corresponding second article in succession; and
    assembling each first article to the corresponding second article.

2. The method of claim 1, wherein the substrate is a plastic, paper, or foil.

3. The method of claim 1, wherein adjacent first elements are drawn to within the second spacing from one another.

4. The method of claim 1, wherein displacing the portions of the first substrate between adjacent first elements out of the plane of the first substrate comprises applying negative pressure to the portions of the first substrate to draw the portions out of plane.

5. The method of claim 1, wherein displacing the portions of the first substrate between adjacent first elements out of the plane of the first substrate comprises applying positive pressure to the portions of the first substrate to impel the portions out of plane.

6. The method of claim 5, wherein applying positive pressure comprises applying a mechanical force to the portions of the first substrate to impel the portions out of plane.

7. The method of claim 1, wherein displacing includes applying a vacuum or suction force.

8. The method of claim 1, wherein the first and second articles are components of an RFID device.

9. The method of claim 1, wherein the first and second articles are antenna elements.

10. The method of claim 1, further comprising after assembling the articles:
    cutting the second substrate between adjacent second articles; and
    releasing the displaced portions of the first substrate into the plane of first substrate.

11. The method of claim 1, wherein assembling the articles comprises one selected from the group consisting of applying adhesive to at least one of the articles, applying pressure to the articles, applying heat to the articles, soldering the articles, and welding the articles.

12. The method of claim 1, wherein the first articles are RFID inlays and the second articles are materials for an apparel hang tag.

13. The method of claim 1, wherein displacing the portions of the first substrate between adjacent first elements out of the plane of the first substrate comprises the step of wrapping the first substrate around a toothed wheel.

14. The method of claim 1, wherein displacing the portions of the first substrate between adjacent first elements out of the plane of the first substrate comprises force created by a stepper motor or dancer bar.

15. The method of claim 8, wherein one of the components is a chip or strap.

* * * * *